May 23, 1967 P. N. WOLFE 3,321,711
SPACE CHARGE LIMITED CONDUCTION SOLID STATE ELECTRON DEVICE
Filed Dec. 12, 1963
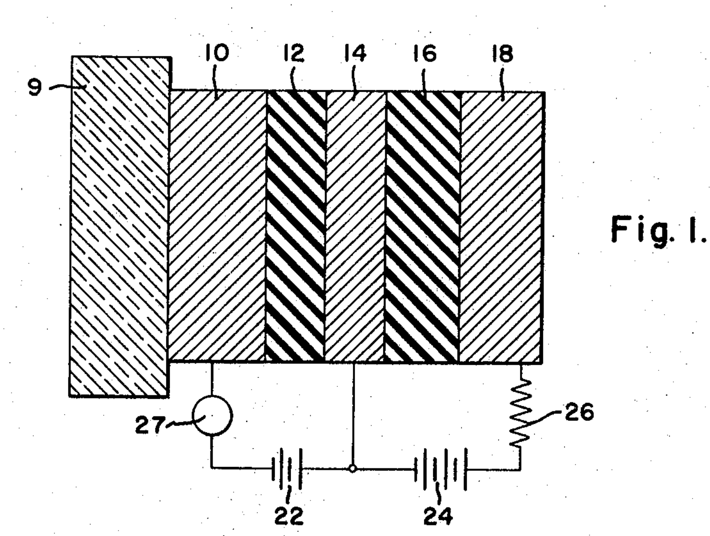
Fig. I.
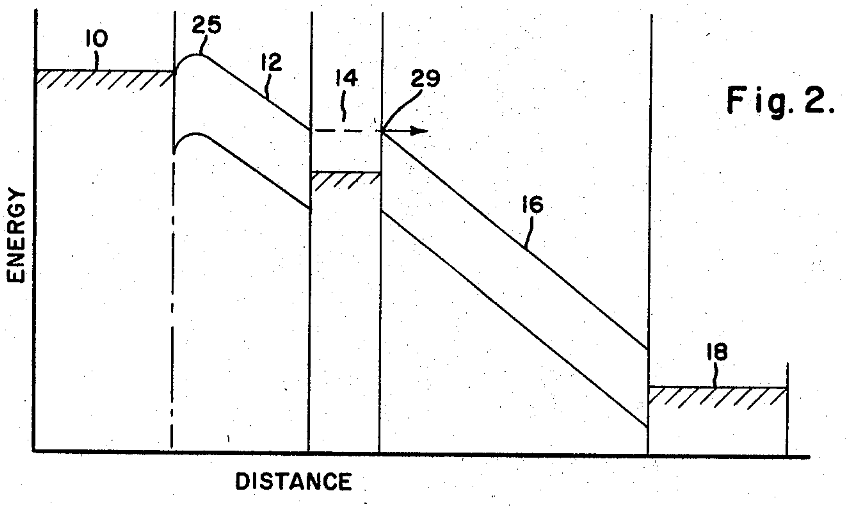
Fig. 2.
WITNESSES:
John G. Chopp
James F. Young
INVENTOR
Peter N. Wolfe
BY Charles F. Renz
ATTORNEY United States Patent Office 3,321,711
Patented May 23, 1967

3,321,711
SPACE CHARGE LIMITED CONDUCTION SOLID STATE ELECTRON DEVICE
Peter N. Wolfe, Penn Hills, Pa., assignor to Westinghouse Electric Corporation, Pittsburgh, Pa., a corporation of Pennsylvania
Filed Dec. 12, 1963, Ser. No. 330,140
6 Claims. (Cl. 330—39)

This invention relates to a solid state electron device and more particularly to a three-terminal active device.

Thin film active devices of the type described in U.S. Patent 3,056,073, issued Sept. 25, 1962, entitled, "Solid State Electron Devices," by C. A. Mead utilize the tunneling effect phenomenon. In this phenomenon, electrons from an emitter electrode tunnel through a thin insulating film to provide hot electrons capable of penetrating through a base layer and being, in turn, injected into a base-collector region. The tunnel type device suffers from one major disadvantage in that to obtain the tunneling phenomenon it is necessary that the thin insulating layer have a thickness of the order of the mean-free path of the electron or less. In most cases, this means that the thickness of this layer must be less than 50 angstroms. It is very difficult to provide a uniform thin coating of this thickness and in which the layer is completely free of pinholes.

It is accordingly an object of this invention to provide an improved solid state electron device.

It is another object to provide an improved solid state electron device of the three-terminal active type.

It is a further object to provide an improved solid state amplifier device.

It is a further object of the present invention to provide an improved solid state electron device in which the layers of the device are of a practical reproducible thickness.

Briefly, the present invention accomplishes the above cited objects by providing a three-terminal solid state device in which the insulating layers between the terminal, and particularly the insulating layer between the emitter and base contact terminals, may be of a thickness greater than 100 angstroms. More specifically, this is accomplished by utilizing space-charge limited conduction between the emitter and base electrodes combined with a sharp downward discontinuity at the interface of the insulating layer and the base contact facing the emitter for the production of hot electrons in the thin film active device.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings, in which:

FIGURE 1 is a schematic diagram embodying the teachings of the present invention; and FIG. 2 is an energy versus distance diagram used to aid in the explanation of the structure and operation of the present invention.

Referring to FIGURE 1, a three-terminal active device is illustrated. The three-terminal active device includes a support member 9 of a suitable material such as glass. An emitter layer 10 of a suitable electrically conductive material such as aluminum is deposited on one surface of the support member 9. A coating 12 of an insulating material such as cadmium sulfide is deposited on the emitter layer 10. On top of the insulating coating 12, there is deposited an electrically conductive coating such as gold to provide the base electrode 14. A second insulating coating 16 is deposited on the base 14 of a suitable material such as cadmium sulfide. An electrically conductive coating 18 of a suitable material such as gold is deposited on the insulating coating 16 to provide the collector electrode 18.

Referring to FIG. 2, an explanation and description of the materials in the layers of the device shown in FIGURE 1 and the type of contact surfaces between the respective layers is given. The layer 10 may serve as a support member if desired and is of a suitable electrically conductive material such as aluminum or indium. The thickness of the layer 10 is not critical and may be about 8 microns. The insulating layer 12 may be of a suitable material such as cadmium sulfide or aluminum oxide and of a thickness of one hundred to several thousand angstroms. The contact between the layers 10 and 12 should be an ohmic contact to provide an electron injecting contact from the emitter layer 10 into the insulating layer 12. This means that the Fermi level of the metallic layer 10 is above or within a few tenths of an electron volt of the conduction band edge of the insulating material in layer 12 when placed in intimate contact.

The important contact is that between the insulating layer 12 and the base contact layer 14. The base layer is of a material such as gold, silver or platinum and of a thickness of about 100 angstroms. The layer 14 should be as thin as possible and yet still provide electrical conductivity. The contact between the layers 12 and 14 is an intimate blocking contact, that is, the Fermi level of the metal used in the base electrode 14 is at least ½ of an electron volt below the conduction band edge of the insulator in layer 12. This contact also may be referred to as a non-ohmic contact and the material in the base layer should be of a low work function material.

It is necessary that the conduction band edge of the insulator 12 be above the Fermi level of the base layer 14. The minimum available energy decreases rapidly at the interface between layers 12 and 14. This rapid decrease or discontinuity must take place in less than the mean-free path of the electron. By use of this type of interface the electrons entering the base layer 14 will be hot and of sufficient energy to pass over the barrier at the interface between the base layer 14 and the insulating layer 16.

The next layer 16 is a second insulating layer of a material such as aluminum oxide, cadmium sulfide, magnesium oxide, or silicon monoxide and having a thickness of 10,000 angstroms. The contact between the metal layer 14 and the insulating layer 16 is an intimate type contact. The intimate contact between the layers 14 and 16 is a non-ohmic contact in which the Fermi level of the metal of layer 14 is about ½ electron volt below the conduction band edge of the insulating material in the layer 16. It should be noted here that it will usually be desirable to have the conduction band edge of the insulator 16 as close or closer to the Fermi level of layer 14 than is the conduction band edge of the insulating material in layer 12. The contact between the layer 14 and the layer 16 is such as to substantially prevent electrons within the base layer 14 from being emitted into the conduction band of the insulator 16 and only the hot electrons will be able to enter the layer 16.

The next layer 18 is the collecting layer which is also in intimate contact with the insulating layer 16 and this contact is not of a critical nature and may be an ohmic contact. The collector layer 18 is also not critical as to thickness but should be of a sufficient thickness to provide electrical conductivity laterally across the layer. Suitable materials for the layer 18 are gold, silver, platinum or copper.

One method of fabricating this device would be to provide a substrate or support 9 of a material such as glass and evaporate the layer 10 of aluminum onto the support 9 to provide the emitter layer 10. The layer 10 may be evaporated in a vacuum of about $10^{-6}$ torr. The layer 12 may be provided by anodizing to obtain a layer of aluminum oxide at least 100 angstroms or greater for the insulating layer 12.

The layer 14 may also be evaporated in a vacuum to provide a thin layer of about 100 angstroms in thickness of a material such as gold. The layer 16 may be deposited on the layer 14 by evaporating a suitable layer such as cadminum sulfide. The collector electrode 18 may be provided by evaporating a suitable material such as gold onto the insulating layer 16.

As indicated in FIGURE 1, a suitable potential source 22 is connected across the emitter 10 and the base 14 and is shown in the drawing as a battery 22 with the negative terminal connected to the emitter 10 and the positive terminal connected to the base 14. The voltage impresses a field across the layer 12 and provides means of transporting electrons across the layer as well as modifying the space-charge barrier potential 25. An input signal source 27 is connected in series with source 22 and modulates the space-charge potential barrier to vary the electron flow from the emitter 10.

In addition, a second voltage source 24 is connected from the base electrode 14 to the collector electrode 18 with the negative terminal of the voltage source 24 connected to the base contact 14 and the positive terminal to the collector 18. The voltage source 22 may be about one volt while the voltage source 24 may be 50 to 100 volts. The output signal is derived from an output resistor 26 connected in series with the source 24.

In the operation of the device, electrons are injected into the layer 12 from the emitter layer 10 by means of the injecting contact between the two layers. The voltage impressed across the layer 12 by means of the voltage source 22 will lower the potential barrier 25 formed adjacent to the injecting surface of layer 10 due to space-charge and will transport the electrons across the layer 12. The electrons emitted from the emitter 10 will go into the conduction band of the insulator 12 and be transported across the insulator layer 12 to the base 14. The base 14 is made sufficiently thin that electrons are able to penetrate through the thin conductive layer 14 and enter into the second insulating layer 16. The electrons will flow across the layer 12 just above the conduction band edge and will enter the base layer 12 with sufficient energy to penetrate the layer 14 and pass over the barrier 29 at the interface between the layers 14 and 16. The electrons entering the base 14 from the layer 12 are able to enter the layer 16 while electrons within base layer 14 do not have adequate energy to get over the barrier 29. The flow of electrons in the layer 16 which is collected by the collector 18 results in a large voltage drop across the output resistor 26. This provides an amplified output signal. In analogy with the vacuum tube, the potential applied between the emitter 10 and base 14 controls the injection of electrons into the space between the base and collector and a voltage gain results from the device because of the somewhat larger potential applied between the base 14 and collector 18. In addition, as is well known in the art of transistors the input signal may be inserted into the system by several means such as grounding the emitter and applying the signal to the emitter or grounding the base and applying the signal to the base electrode.

While there have been shown and described what are at present considered to be the preferred embodiments of the invention, modifications thereto will occur to those skilled in the art. It is not desired, therefore, that the invention be limited to the specific arrangement shown and described and it is intended to cover in the appended claims all such modifications as fall within the true spirit and scope of the invention.

I claim as my invention:

1. A solid state device comprising a plurality of layers in intimate contact comprising a first layer of an electrically conductive material, a second layer of insulating material of a thickness greater than the mean-free path of an electron in intimate contact with said first layer to provide by means of said first layer an electron injecting contact, a third layer of electrically conductive material in non-ohmic contact with said second layer and providing a blocking contact with said layer, said blocking contact providing a sharp downward discontinuity between the conduction edge of said second layer and the Fermi level of said third layer, a source of input potential connected across said first and third layers for impressing a field across said second layer to transport the electrons injected into said second layer from said first layer across said second layer and into said third layer, said third layer of a thickness that permits the electrons transported across said second layer to penetrate said third layer if of sufficient energy, a fourth layer of insulating material in intimate contact with said third layer and providing a blocking contact with said third layer, a fifth layer of electrically conductive material in intimate contact with said fourth layer, and an output source of potential connected across said third and fifth layers for impressing a field across said fourth layer to transport the electrons injected into said fourth layer through said third layer so as to derive an output signal across said third and fifth layers.

2. A solid state device comprising a plurality of layers, a first layer of electrically conductive material, a second layer of an insulating material in intimate contact with said first layer and of a thickness greater than 100 angstroms, and greater than the mean free path of an electron, the Fermi level of said electrically conductive material in said first layer above or within a few tenths of an electron volt of the conductive band edge of the insulating material in said second layer when placed in intimate contact, a third layer of electrically conductive material in intimate contact with the opposite surface of said insulating layer and with a sharp downward discontinuity between the conduction band edge of the material in said second layers and the Fermi level of said third layer, a fourth layer of an insulating material in intimate contact with said third layer with the Fermi level of the third layer below the conduction band edge of said fourth layer and a fifth layer of electrically conducting material in contact with said fourth layer.

3. A solid state electron device comprising a plurality of lamina, a first layer of electrically conductive material, a second layer of insulating material in intimate contact with said first layer and of suitable matching material to provide an electron injecting contact from said first layer into said second layer, said second layer having a thickness greater than the mean-free path of an electron, a third layer of electrically conductive material in intimate contact with the opposite surface of said second layer, and providing a blocking contact of sharp downward discontinuity such that the Fermi level of the third layer is at least one-half an electron volt or more below the conduction band edge of said insulating layer, a fourth layer of insulating material in intimate contact with the opposite surface of said third layer and also in blocking contact therewith such that the conduction band edge of said insulating material of said fourth layer is below the conduction band edge of the insulating material in said second layer, and a fifth layer of electrically conductive material in contact with the opposite surface of said fourth layer of insulating material, circuit means associated with said first and third layers for impressing a signal on said first and third layers to transport electrons from said injecting contact between said first and second layer such that the electrons arrive in said third layer in an excited state and pass through said third layer into said fourth layer, and circuit means associated with said third layer and said fifth layer for transporting the electron emitted into said fourth layer from said third layer to said fifth layer and deriving a signal representative of the electron current flowing between said third and fifth layer.

4. A solid state amplifier device comprising a plurality of layers in intimate contact comprising a first layer of an electrically conductive material, a second layer of insulating material in intimate contact with said first layer to provide by means of said first layer a space-charge limiting potential barrier, said second layer having a thickness greater than the mean free path of an electron, a third layer of electrically conductive material in non-ohmic contact with said second layer and providing a blocking contact with said second layer, said blocking contact providing a sharp downward discontinuity between the conduction edge of said second layer and the Fermi level of said third layer, a bias source of potential connected across said first and third layers for impressing a field across said second layer to transport the electrons injected into said second layer from said first layer across said second layer and into said third layer, means including an input signal to modulate said potential barrier, said third layer of a thickness to permit the electrons transported across said second layer to penetrate said third layer, a fourth layer of insulating material in intimate contact with said third layer and providing a blocking contact with said third layer, a fifth layer of electrically conductive material in intimate contact with said fourth layer, and a second source of potential connected across said third and fifth layers for impressing a field across said fourth layer to transport the electrons injected into said fourth layer through said third layer and means to drive an output signal across said third and fifth layers representative of said input signal.

5. A solid state electron device comprising a plurality of lamina, a first layer of electrically conductive material, a second layer of insulating material in intimate contact with said first layer and of suitable matching material to provide an ohmic electron injecting contact from said first layer into said second layer, said second layer having a thickness greater than 100 angstroms, and greater than the mean free path of an electron, a third layer of electrically conductive material in intimate contact with the opposite surface of said insulating layer, and providing a blocking contact of sharp downward discontinuity such that the Fermi level of the third layer is below the conduction band edge of said insulating layer, a fourth layer of insulating material in intimate contact with the opposite surface of said third layer and also in blocking contact therewith such that the conduction band edge of said insulating material in said fourth layer is below the conduction band edge of the insulating material in said second layer, and a fifth layer of electrically conductive material in contact with the opposite surface of said fourth layer of insulating material, circuit means associated with said first and third layers for impressing an input signal on said first and third layers to modulate the number of electrons transported across said second layer, said electrons arriving in said third layer in an excited state and pass through said third layer into said fourth layer, and circuit means associated with said third layer and said fifth layer for transporting the electrons emitted into said fourth layer to said fifth layer and deriving an output signal representative of said input signal.

6. A solid state amplifier device comprising a plurality of layers in intimate contact comprising a first layer of an electrically conductive material, a second layer of insulating material in intimate contact with said first layer to provide by means of said first layer an ohmic electron injecting contact, said second layer of a greater thickness than required for tunneling and greater than mean free path of an electron, a third layer of electrically conductive material in non-ohmic contact with said second layer and providing a blocking contact with said second layer, said blocking contact providing a sharp downward discontinuity in occupied energy states, an input signal potential source connected across said first and third layers for impressing a field across said second layer to transport the electrons injected into said second layer from said first layer across said second layer and into said third layer, said third layer of a thickness to permit the electrons transported across said second layer to penetrate said third layer, a fourth layer of insulating material in intimate contact with said third layer and providing a blocking contact with said third layer, a fifth layer of electrically conductive material in intimate contact with said fourth layer, and a second source of potential connected across said third and fifth layers for impressing a field across said fourth layer to transport the electrons injected into said fourth layer through said third layer and circuit means to derive an output signal across said third and fifth layers.

References Cited by the Examiner

UNITED STATES PATENTS

| | | | |
|---|---|---|---|
| 3,056,073 | 9/1962 | Mead | 317—234 |
| 3,121,177 | 2/1964 | Davis | 317—234 |
| 3,121,809 | 2/1964 | Atalla | 317—234 |

OTHER REFERENCES

Nanvati, "An Introduction to Semiconductor Electronics," McGraw-Hill Book Co., Inc., 1963, pages 110–114 (TK 7872, S4N27).

ROY LAKE, *Primary Examiner.*

F. D. PARIS, N. KAUFMAN, *Assistant Examiners.*